(12) United States Patent
Lutz et al.

(10) Patent No.: US 6,846,110 B2
(45) Date of Patent: Jan. 25, 2005

(54) PLAY-FREE RADIAL BALL BEARING

(75) Inventors: Rainer Lutz, Markt Erlbach (DE); Alexander Zernickel, Herzogenaurach (DE); Herbert Erhardt, Herzogenaurach (DE); Reinhold Nützel, Adelsdorf (DE)

(73) Assignee: INA-Schaeffler KG, Herzogenaurach (DE)

( * ) Notice: Subject to any disclaimer, the term of this patent is extended or adjusted under 35 U.S.C. 154(b) by 54 days.

(21) Appl. No.: 10/189,151

(22) Filed: Jul. 3, 2002

(65) Prior Publication Data

US 2003/0012473 A1 Jan. 16, 2003

(30) Foreign Application Priority Data

Jul. 4, 2001 (DE) .......................................... 101 32 470

(51) Int. Cl.[7] .............................................. F16C 33/66
(52) U.S. Cl. ...................................... 384/537; 384/517
(58) Field of Search .............................. 384/499, 500, 384/502, 505, 510, 513, 514, 518, 519, 517, 537, 539, 535, 536

(56) References Cited

U.S. PATENT DOCUMENTS

| | | | | |
|---|---|---|---|---|
| 3,876,266 A | * | 4/1975 | Rozentals | 384/536 |
| 3,940,192 A | * | 2/1976 | Hagele | 384/517 |
| 4,718,781 A | * | 1/1988 | Gerard | 384/495 |
| 5,209,194 A | * | 5/1993 | Adachi et al. | 123/90.17 |
| 5,539,597 A | * | 7/1996 | Blanks | 360/265.6 |
| 6,003,907 A | * | 12/1999 | Gau et al. | 285/279 |
| 6,145,199 A | * | 11/2000 | Malchow et al. | 29/898.07 |
| 6,158,896 A | * | 12/2000 | Zernickel et al. | 384/506 |

FOREIGN PATENT DOCUMENTS

| | | |
|---|---|---|
| DE | 40 16 839 A1 | 11/1991 |
| DE | 41 08 827 C2 | 9/1992 |
| DE | 41 14 643 C2 | 11/1992 |
| DE | 42 31 272 A1 | 3/1994 |
| DE | 94 00 766 U1 | 4/1994 |
| DE | 43 93 663 C1 | 2/1997 |
| DE | 199 22 914 A1 | 11/2000 |

* cited by examiner

Primary Examiner—David A. Bucci
Assistant Examiner—Julie K. Smith
(74) Attorney, Agent, or Firm—Henry M. Feiereisen

(57) ABSTRACT

A play-free radial ball bearing, includes an inner bearing ring and two outer bearing rings which are disposed in spaced-apart relationship and define a common raceway. A spring element applies an axial force on one of the outer bearing rings to thereby press the outer bearing rings resiliently against one another. The outer bearing rings and the spring element are surrounded by a tolerance ring which is made of plastic material to provide a structural unit, whereby the tolerance ring has a shoulder on one end for radially surrounding the spring element and at least one retaining lug on another end for radially surrounding the other one of the outer bearing rings.

9 Claims, 4 Drawing Sheets

PLAY-FREE RADIAL BALL BEARING

CROSS-REFERENCES TO RELATED APPLICATIONS

This application claims the priority of German Patent Application Serial No. 101 32 470.7, filed Jul. 4, 2001, pursuant to 35 U.S.C. 119(a)–(d), the subject matter of which is incorporated herein by reference.

BACKGROUND OF THE INVENTION

The present invention relates, in general, to a play-free radial ball bearing, and more particularly to a play-free radial ball bearing for steering columns of motor vehicles.

German Pat. No. DE 41 08 827 C2 describes a play-free ball bearing having two outer bearing rings disposed in axial spaced-apart relationship and forming a common outer raceway. The freedom of play is realized through provision of a corrugated spring which extends between a radially inwardly directed flange of an outer sleeve and one of the outer bearing rings. Outer bearing rings and spring element are held together by the outer sleeve to establish a captivated unitary structure, whereby the outer sleeve surrounds the outer bearing rings and spring element on both sides with a respective radially inwardly directed flange.

German Pat. No. DE 41 14 643 C2 describes a roller bearing with an outer bearing ring comprised of two ring portions, which form the outer raceway. Radially inwardly directed flanges on both sides of an outer sleeve respectively surround both ring portions including the corrugated spring, to implement the freedom of play.

FIG. 1 shows a longitudinal section of a conventional steering bearing in the form of a radial ball bearing 1 employing an outer sleeve 7 to hold the components of the ball bearing 1 together. The ball bearing 1 has an axis 2 and is configured as a four-point ball bearing, including an inner bearing ring 3, which is designed as a massive ring. Disposed in spaced-apart coaxial relationship to the inner ring 3 is an outer bearing ring 4, which is comprised of two outer ring portions 4.1, 4.2 spaced from one another at formation of a gap therebetween and establishing together the outer raceway for ball members 5. A corrugated spring 6 loads the movable ring portion 4.1 against the ball members 5 and thus against the other ring portion 4.1. The spring bias is hereby so adjusted as to prevent excessive friction moment in the bearing 1 while ensuring the absence of resilience in axial direction when the steering wheel is under load. The outer sleeve 7, which holds the components of the bearing 1 together, has two radially inwardly directed flanges 7.1, 7.2 to embrace the immobile ring portion 41 and axially ring portion 4.2 of the outer ring 4. This type of bearing is complicated because the outer sleeve 7 has to be bent to form the flanges 7.1, 7.2, and in addition no tolerance compensation between a receiving bore in the housing and the outer surface area of the sleeve 7 is possible.

German Pat. No. DE 43 93 663 C1 describes a radial ball bearing, which includes a spring element in the form of a ring of polymeric material to implement the freedom of play.

For a number of reasons, the various proposals of conventional radial ball bearings are endowed with drawbacks and shortcomings relating for example to complicated manufacturing techniques or to the effect that is hoped to be obtained but may not always be realized. All proposals involve the use of an outer sleeve with radially inwardly directed flanges to hold together the outer bearing rings with the pertaining spring element in order to form a unitary structure. This, however, is very complex. Also, tolerance compensation between receiving housing and outer sleeve is effectively excluded, and the spring element is not protected against overstress.

It would therefore be desirable and advantageous to provide an improved play-free radial bearing which obviates prior art shortcomings and which is easy to manufacture and to assemble which still being reliable in operation and allowing a tolerance compensation with the receiving bearing housing.

SUMMARY OF THE INVENTION

According to one aspect of the present invention, a play-free radial ball bearing includes an inner bearing ring, two outer bearing rings disposed in spaced-apart relationship and defining a common raceway, a spring element applying an axial force on one of the outer bearing rings to thereby press the outer bearing rings resiliently against one another, and a tolerance ring made of plastic material and surrounding the outer bearing rings and the spring element to provide a structural unit, wherein the tolerance ring has a shoulder on one end for radially surrounding the spring element and at least one retaining lug on another end for radially surrounding the other one of the outer bearing rings.

The present invention resolves prior art problems by providing a tolerance ring, which receives the outer bearing rings and the spring element and can be made of varying dimensions in a simple manner through an injection molding process. In addition, the tolerance ring significantly facilitates assembly of the overall bearing because inner ring, ring of ball members, spring element and outer rings can simply be inserted in the tolerance ring. Compensation of distances between outer bearing rings and receiving housing can easily be effected by the provision of the tolerance ring according to the present invention so that dimensional variations as a consequence of manufacturing processes are of no consequence as far as the seat of the bearing ring in the housing is concerned. Also, making the tolerance ring of polymer material effectively dampens vibrations and impact stress.

According to another feature of the present invention, the tolerance ring may have a plurality of retaining lugs and is defined by a circumference which is formed with a plurality of through openings spaced evenly about the circumference, wherein each of the through openings has an end face formed by an associated one of the retaining lugs. Suitably, the retaining lugs are radially elastic. Thus, assembly is especially simplified as the retaining lugs are initially deflected radially outwards, as the outer bearing rings are inserted, and subsequently return radially inwards, after the retaining lugs have passed, and thereby assure integrity of the entire bearing assembly.

According to another feature of the present invention, the tolerance ring may have a stepped internal bore configured for receiving the outer bearing rings and having a greater diameter in an area of the axially movable bearing ring, wherein the outer bearing rings have same radial dimension. The enlarged internal bore in the area of the axially movable outer bearing ring allows unhindered movement while both outer bearing rings have same size. The provision of identically sized outer bearing rings also reduces costs of the bearing assembly.

According to another feature of the present invention, the tolerance ring may have a protrusion in an area of the axially movable bearing ring for limiting a movement of the moveable bearing ring in axial direction. The provision of the protrusion provides a protection for the spring element during pulsating stress, which means that the spring element cannot seize because of the continuous presence of a receiving space of certain size.

According to another feature of the present invention, the tolerance ring may an outer surface area provided with at least one rib which projects out in radial direction. In this way, securement in a housing bore is especially simplified because material of the rib can be squeezed. Moreover, the circumferential rib also effects a sealing of the through openings for supporting the retaining lugs.

According to another feature of the present invention, the inner bearing ring may be made through a process without material removal and may be so sized as to project beyond the tolerance ring in axial direction.

According to another feature of the present invention, the spring element may be a corrugated spring, disk spring, or rubber ring.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
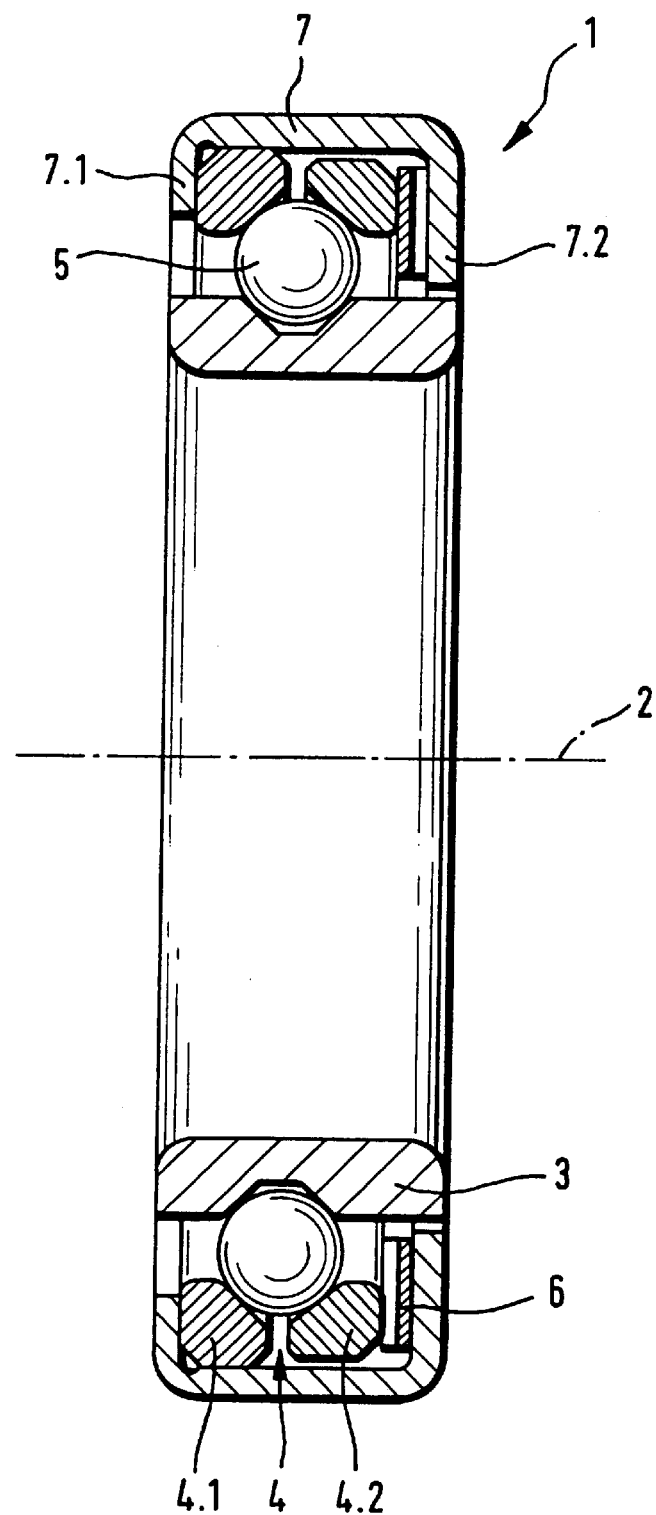
FIG. 1 is a longitudinal section of a conventional radial ball bearing.

Throughout all the Figures, same or corresponding elements are generally indicated by same reference numerals.

Figure 2:
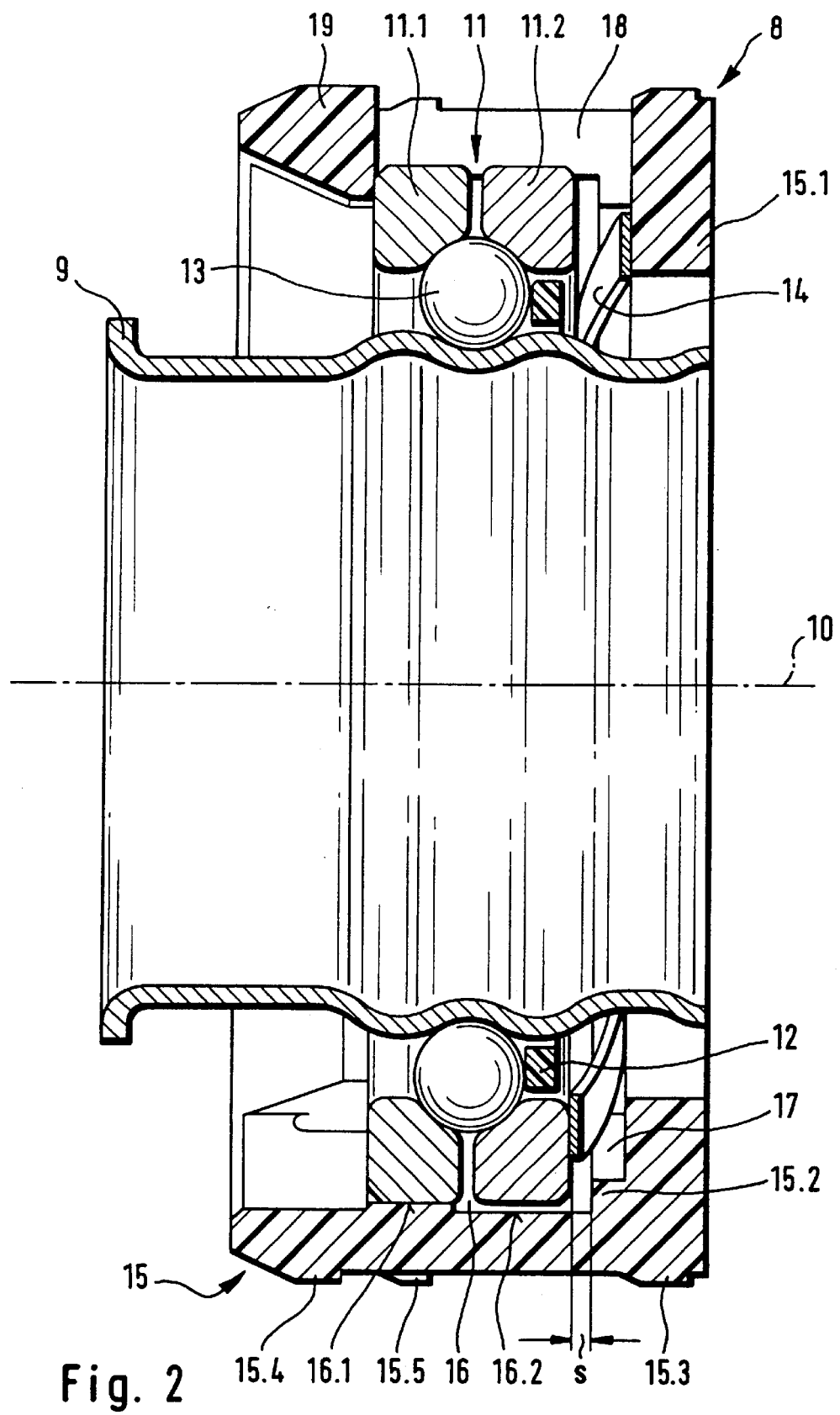
FIG. 2 is a longitudinal section of a radial ball bearing according to the present invention, taken along the line II—II in FIG. 4.

Turning now to the drawing, and in particular to FIG. 2, there is shown a longitudinal section of a radial ball bearing according to the present invention, generally designated by reference numeral 8 and defining an axis 10. The ball bearing 8 has an inner bearing ring 9, which is made by a shaping process without material removal, and an outer bearing ring 11, which is comprised of two ring portions 11.1, 11.2, wherein the ring portion 11.1 is immobile and the ring portion 11.2 is movable in axial direction. The ring portions 11.1, 11.2 of the outer bearing ring 11 have identical dimension in radial direction and establish together the outer raceway for ball members 13 which are guided in a cage 12. A spring element in the form of a corrugated spring 14 urges the moveable outer ring portion 11.2 against the ball members 13 and thus against the other ring portion 11.2 to thereby provide the freedom of play in the ball bearing 8. Of course, the spring element in the form of a corrugated spring 14 is shown here by way of example only, and may be configured as a disk spring or rubber ring, without departing from the spirit of the present invention.

The reason for allowing manufacture of the ring portions 11.1, 11.2 of the outer bearing ring 11 of same radial dimension resides in the arrangement of a tolerance ring 15 which is made of polymer material and has a stepped internal bore 16 in the area of the outer ring portions 11.1, 11.2. The internal bore 16 has a bore section 16.1 for supporting the ring portion 11.1, and a bore section 16.2 which has a greater diameter than the bore section 16.1, so that the moveable ring portion 11.2 can shift in axial direction. The maximum displacement distance of the ring portion 11.2 in axial direction is designated by reference character "s" in FIG. 2. As also shown in FIG. 2, the inner bearing ring 9 projects beyond the tolerance ring 15 in axial direction.

Figure 3:
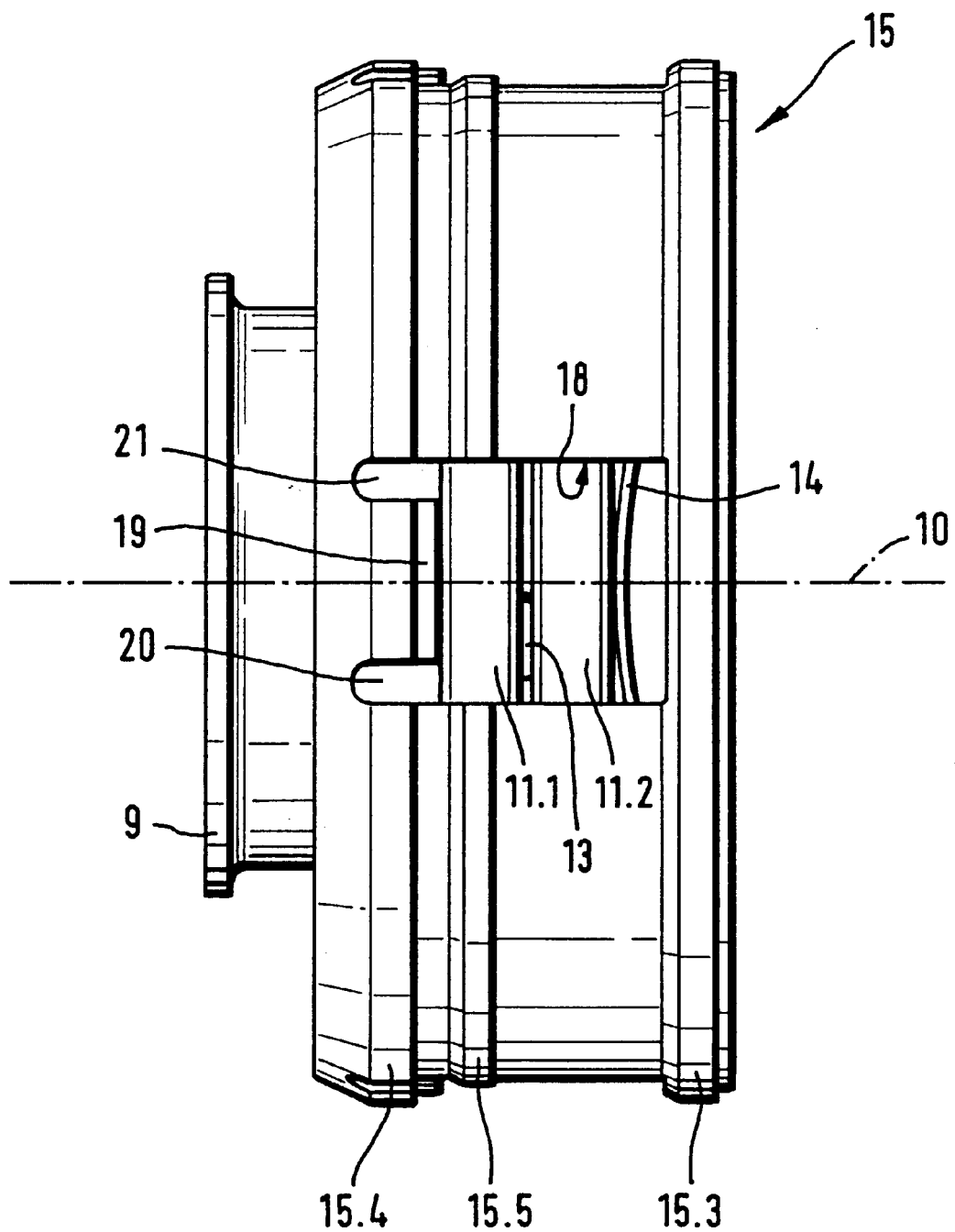
FIG. 3 is a top plan view of the radial ball bearing of FIG. 2.

As shown in FIGS. 2 and 3, the tolerance ring 15 is provided on the right hand side of the drawing with a radially inwardly directed shoulder 15.1 having an inner end face for support of the corrugated spring 14. In the area of the axially moveable ring portion 11.2, the tolerance ring 15 is formed with a protrusion 15.2 to provide a stop to limit an axial displacement of the ring portion 11.2. Thus, seizing of the corrugated spring 14 is prevented, even when subjected to a great axial load, because of the continuous presence of a receiving space 17, which maintains its size, to receive the corrugated spring 14.

Figure 4:
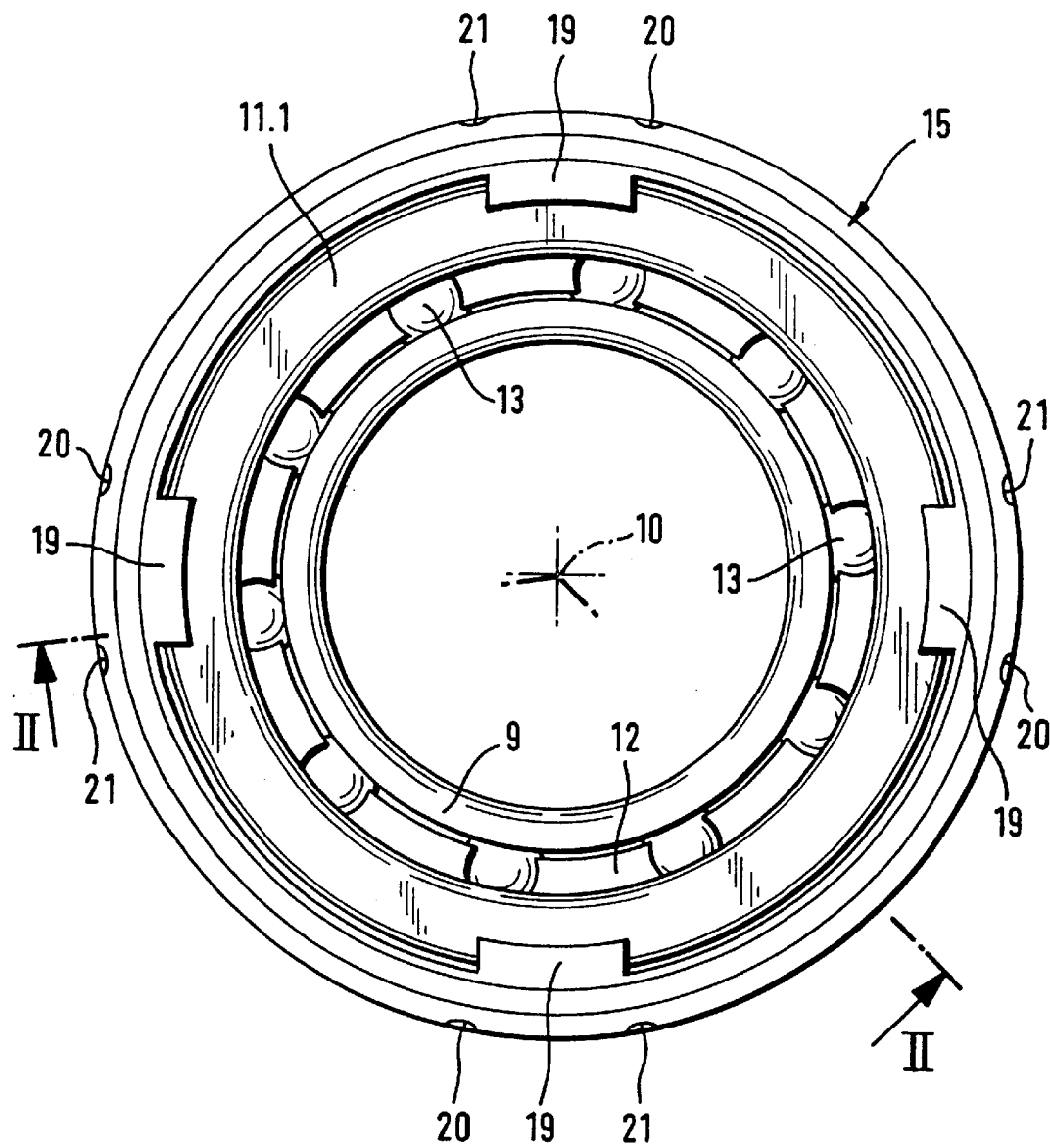
FIG. 4 is a side view of the radial ball bearing of FIG. 2.

As shown in FIGS. 2 to 4, the tolerance ring 15 has a circumference formed with four, evenly spaced, through openings 18 having one end face (left-hand end face, as shown in FIG. 2) formed by a radially elastic retaining lug 19 which radially covers the outer ring portion 11.1. Each retaining lug 19 is so configured that two free spaces 20, 21 remain on opposite sides of the retaining lug 19, as shown in particular in FIGS. 3 and 4. In this way, the components of the ball bearing 8 are captivated to form a structural unit. Disposed on its outer surface area of the tolerance ring 15 are three ribs 15.3, 15.4, 15.5 in axial spaced-apart relationship, which project out in radial direction to facilitate a press-fitting of the ball bearing 8 in a housing.

Assembly of the ball bearing 8 can be simply realized by pushing the outer ring portions 11.1, 11.2 into the tolerance ring 15, whereby the retaining lugs 19 yield as they deflect radially outwards and snap back radially inwards to engage behind the outer ring portion 11.1, to thereby assure axial integrity of the ball bearing 8.

While the invention has been illustrated and described as embodied in a play-free radial ball bearing, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A play-free radial ball bearing, comprising:
   an inner bearing ring;
   two outer bearing rings disposed in spaced-apart relationship and defining a common raceway;
   a spring element applying an axial force on one of the outer bearing rings to thereby press the outer bearing rings resiliently against one another; and
   a tolerance ring made of plastic material and surrounding the outer bearing rings and the spring element to provide a structural unit, wherein the tolerance ring has a shoulder on one end for radially surrounding the spring element and at least one retaining lug located at an axially inner portion of the tolerance ring for radially resting against a confronting surface of the other one of the outer bearing rings.

2. The ball bearing of claim 1, wherein the tolerance ring includes a circumferential through opening having an end face formed by the retaining lugs.

3. The ball bearing of claim 1, wherein the tolerance ring has a plurality of said retaining lug and is defined by a circumference which is formed with a plurality of through openings spaced evenly about the circumference, wherein each of the through openings has an end face formed by an associated one of the retaining lugs.

4. The ball bearing of claim 3, wherein the retaining lugs are radially elastic.

5. The ball bearing of claim 1, wherein the tolerance ring has a stepped internal bore configured for receiving the outer bearing rings and having a greater diameter in an area of the one bearing ring, which is movable in axial direction, wherein the outer bearing rings have same radial dimension.

6. The ball bearing of claim 1, wherein one of the bearing rings is movable in axial direction, said tolerance ring having a protrusion extending axially from the tolerance ring in a direction of the one bearing ring, so as to limit a movement of the one bearing ring in axial direction.

7. The ball bearing of claim 1, wherein the tolerance ring has an outer surface area provided with at least one rib which projects out in radial direction.

8. The ball bearing of claim 1, wherein the inner bearing ring is made through a shaping process without material removal and projects beyond the tolerance ring in axial direction.

9. The ball bearing of claim 1, wherein the spring element is a member selected from the group consisting of corrugated spring, disk spring, and rubber ring.

* * * * *